R. M. G. PHILLIPS.
FIRELESS COOKER.
APPLICATION FILED FEB. 12, 1914.
1,109,542.
Patented Sept. 1, 1914.
2 SHEETS—SHEET 1.
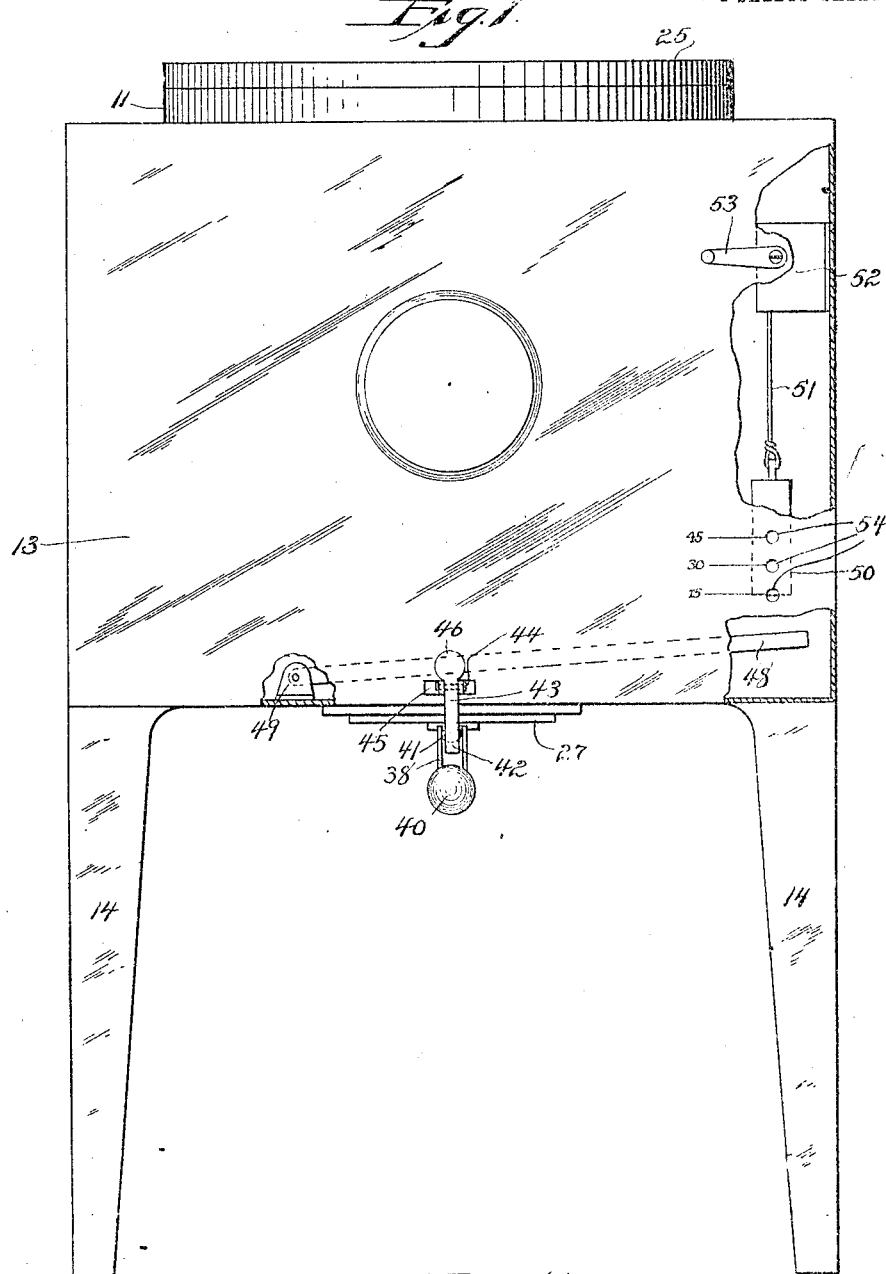

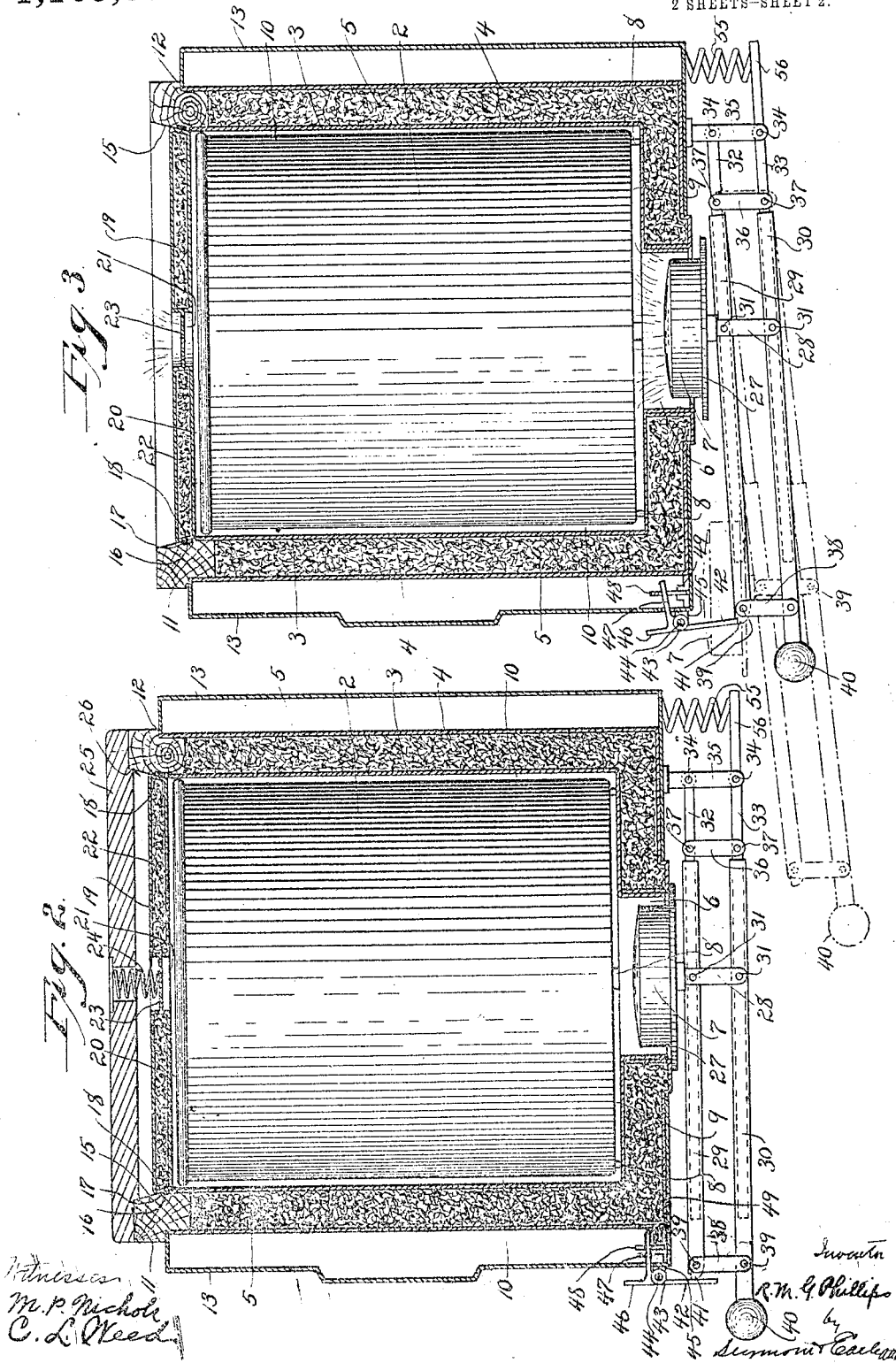

UNITED STATES PATENT OFFICE.

ROSS M. G. PHILLIPS, OF WEST HAVEN, CONNECTICUT, ASSIGNOR TO THE AUTOMATIC STOVE CO., OF MINNEAPOLIS, MINNESOTA, A CORPORATION.

FIRELESS COOKER.

1,109,542.  Specification of Letters Patent.  Patented Sept. 1, 1914.

Application filed February 12, 1914. Serial No. 818,279.

*To all whom it may concern:*

Be it known that I, ROSS M. G. PHILLIPS, a citizen of the United States, residing at West Haven, in the county of New Haven and State of Connecticut, have invented a new and useful Improvement in Fireless Cookers; and I do hereby declare the following, when taken in connection with the accompanying drawings and the characters of reference marked thereon, to be a full, clear, and exact description of the same, and which said drawings constitute part of this application, and represent, in—

Figure 1 a view in front elevation of a fireless cooker constructed in accordance with my invention. Fig. 2 a broken view thereof in vertical central section from front to rear, showing the pre-heater or burner in its draft-closing or heat-conserving position. Fig. 3 a corresponding view showing the pre-heater or burner in its intermediate or heating position by full lines, and shown in its retracted or lighting position by broken lines. Fig. 4 a detached sectional view of the burner in front elevation on the line *a—b* of Fig. 3.

My invention relates to an improvement in that class of fireless cookers in which, at a predetermined time, the pre-heater is extinguished and the draft through the insulated container closed for the conservation of the heat stored therein, the object being to produce a convenient, reliable and safe apparatus of the character described.

With these ends in view, my invention consists in a fireless cooker having certain details of construction and combinations of parts as will be hereinafter described and pointed out in the claims.

In carrying out my invention as herein shown, I locate a cylindrical cooking receptacle 2 within a cylindrical insulated container having double walls 3 and 4 with the annular space between the same packed with an insulating material 5, such as asbestos or magnesium. The bottom of the said container is formed with a large concentric opening 6 forming an ingress draft-passage and also forming a chamber for the reception of the pre-heater or burner 7 which is vertically movable with respect to the receptacle 2 which is normally stationary within the insulated container in which it is supported so as to clear the bottom thereof by small feet 8 whereby draft passages 9 and 10 are produced, respectively, between the bottom of the receptacle 2 and the bottom of the container, and between the sides of the container and the sides of the receptacle 2, the said receptacle being enough smaller than the internal diameter of the container to produce the draft passages 9 and 10 in question.

As shown, the container is provided at its upper end with a rim 11 formed with a circumferential shoulder 12 resting upon a casing 13 which may be of any desired form and which, as shown, is supported upon legs 14. The inner face of the rim 11 is beveled as at 15 and formed with a channel 16 for the reception of a packing-ring 17 which coacts with the beveled edge 18 of an insulated cover 19 which, when in position, as shown in Figs. 2 and 3, is separated from the top of the receptacle 2 by means of a narrow draft-passage 20 which leads to an egress draft-passage 21 formed in the center of the said cover. The central portion of the shell 22 of the said cover 19, is struck inward into the egress draft-passage 21 to form a perforated disk 23 which forms a bearing for the lower end of a helical spring 24 the upper end of which is inserted into an opening formed for it in the center of a lid 25 rabbeted as at 26 to adapt it to be set down over the upper edge of the rim 11 for the conservation of the heat stored within the container. The pre-heater or burner 7 will, of course, be determined in its character by the character of the fuel used. As shown, it is formed at its lower edge with an annular draft-closing flange 27 which, when the burner is in its closed or heat-conserving position as shown in Fig. 2, entirely closes the lower end of the concentric ingress draft passage 6 in the bottom of the container.

The burner 7 is provided, as shown, with a pair of depending supporting-arms 28 receiving between them two extension or telescoping tubes 29 and 30 located one above the other in the same vertical plane, the said arms 29 and 30 being secured to the said tubes by means of pivots 31, 31. The said tubes 29 and 30 are respectively sleeved over rods 32 and 33 located one above the other in the same vertical plane and having their rear ends attached by pivots 34, 34, to a bracket 35 depending from the bottom of the casing 13. The said rods 32 and 33 are spaced apart by means of a spacing-link 36 secured at its upper and lower ends to the respective rods by pivots 37, 37. The outer ends of the tubes are similarly connected by a spacing link 38 pivotally connected to them by means of pivots 39, 39. The lower tube 30 is made longer than the upper tube 29 for the attachment of a handle 40. The said tubes, rods and their appurtenances constitute an extension-carrier or fixture for the carriage and vertical and lateral movement of the pre-heater or burner 7 as will be described later on. The outer end of the said upper tube 29 is formed with a nose 41 coacting with the depending latch-arm 42 of a tripping-lever 43 hung upon a pivot 44 in a bracket 45 secured to the front of the casing 13, and furnished with an upwardly extending finger-piece 46 by which the lever is manually set, and with an inwardly extending tripping-arm 47 which passes under a horizontally arranged operating-lever 48 one end of which is pivoted to a bracket 49 located back of the front of the casing 13. The opposite end of the lever 48 extends directly under a weight 50 located within the casing 13 and connected by a cord 51 with a clock-like mechanism 52 the details of which are not shown. This mechanism is furnished with a handle 53 by means of which the weight 50 is raised to a predetermined height gauged by sight-openings 54 in the casing 13. These sight-holes are arranged in a vertical series and adjacent to them are placed numerals 15, 30, 45, indicating time. When the bottom of the weight 50 is raised to the level of the lowest hole 54, it will take fifteen minutes for the weight to descend under the control of the clock-like train 52, into position to operate the lever 48 in tripping the lever 43. By turning the handle 53 to raise the weight 50 to the level of the middle hole 54, it will take thirty minutes for the weight 50 to descend into position to trip the lever 43. Of course the time intervals may be varied as desired, the principle only being illustrated. As soon as the tripping-lever 43 is operated to disengage its latch-arm 42 from the nose 41, a spring 55, as shown, operates to raise the extensible pre-heater carrier and the pre-heater 7 into their closed or heat-conserving positions, this spring being interposed between the bottom of the casing 13 and the rear extension 56 of the lower rod 33.

In using my improved cooking receptacle, the extensible pre-heater carrier is first grasped by its handle 40 and depressed against the tension of the spring 55 to clear the pre-heater 7 from the ingress draft-opening 6 after which the handle 40 is pulled forward to cause the tubes 29 and 30 to ride over the rods 32 and 33, whereby the pre-heater or burner 7 is drawn laterally forward into the position in which it is shown by broken lines in Fig. 3 and in which it is exposed on the outside of the casing 13. In this exposed and accessible position the pre-heater may be charged with alcohol or other fuel as the case may be. In any event, it will be lighted in this position where it is in the open air and unconfined, thus making my improved cooking receptacle immune against the danger of the explosion of the gases liable to accumulate within the container if any time elapses between the generating or turning on of the fuel and the ignition of it as is apt to happen in using pre-heaters which must be lighted in situ under the container. After the burner 7 has been lighted in its retracted and exposed position, the burner-carrier is telescoped, as may be said, by pushing it inward until the burner 7 has been re-registered with the ingress draft-passage 6. When this has been done, downward pressure upon the handle 40 is removed and the spring 55 permitted to raise the burner into its intermediate or heating position in which the nose 41 engages with the lower end of the latch-arm 42 of the tripping-lever 43 as shown by full lines in Fig. 3. In this position of the burner 7 and burner-carrier, the ingress draft-passage 6 is left sufficiently open to take in all of the air required for combustion. The heat generated by the burner now passes upward through the draft-passages 9 and 10 and heats the cooking receptacle 2 and the inner walls of the container, whereby the apparatus will be charged with an amount of heat proportionate to the duration of the flame. Meanwhile the handle 53 has been operated to raise the weight 50 to the height required to consume in its descent under the control of the clock-like mechanism 52, the predetermined time required for the heating of the apparatus. When the time expires the weight will operate the lever 48 which will in turn operate the tripping-lever 43, whereby the spring 55 will be left free to lift the burner 7 into its closed or heat-conserving position in which its flange 27 entirely closes the ingress draft-passage 6. It may be said in this connection that if an alcohol burner is used, the amount of alcohol supplied to it will be proportioned in volume to the length of time which it is desired the pre-heating action of the burner shall cover. The tripping device will accordingly be set to trip the burner and permit the same to go into its draft-closing position just as soon as the light goes out. The burner having been extinguished, as described, the lid 25 is placed upon the rim 11, whereby the spring 24 will crowd the cover 19 down firmly into the rim. The receptacle 2 will then be tightly shut in by the cover 19, while hot air will be prevented from escaping through the perforated disk 23 by the lid 25. The draft through the apparatus having now been closed both top and bottom, the heat stored in the apparatus during the pre-heating period, will be conserved for the gradual cooking of the food within the receptacle.

It is apparent that changes from the construction herein shown and described may be made in carrying out my invention, which consists broadly in the use of a stationary cooking receptacle in combination with a pre-heater movable toward and away from it, whether or not the pre-heater is also adapted to be additionally moved into an exposed position where it may be conveniently charged and lighted, either or both.

A pre-heater carrier constructed in accordance with my invention provides for moving the burner vertically into its heating and heat-conserving positions, and laterally into its lighting position without tilting it so as to cause it to fail to register with the ingress draft-passage or to spill its fuel, if liquid fuel is employed.

I claim:—

1. In a fireless cooker, the combination with a cooking receptacle, of a pre-heater movable toward and away from the bottom of the said receptacle, and means for automatically moving the said pre-heater into its heat-conserving position at a predetermined time.

2. In a fireless cooker, the combination with a stationary cooking receptacle, of a pre-heater movable with respect thereto into heating, heat-conserving and lighting positions, and means for automatically releasing the said pre-heater at a predetermined time for its movement from its heating position into its heat-conserving position.

3. In a fireless cooker, the combination with an insulated container provided at its lower end with an ingress draft-passage, of a cooking receptacle located in the said container, a pre-heater adapted to be entered into the said draft-passage and movable into heating, heat-conserving and lighting positions, and means for automatically releasing the said pre-heater to permit it at a predetermined time to move from its heating or depressed position into its heat-conserving position in which the said passage is closed.

4. In a fireless cooker, the combination with a container provided in its lower end with an ingress draft-passage, of a cooking receptacle located in the container, a pre-heater located below the said container, a pre-heater-carrier upon which the pre-heater is mounted and by which it is moved into its lighting, heating and heat-conserving positions, and automatically operated tripping mechanism co-acting with the said carrier for permitting the same to move the pre-heater into its heat-conserving position for the closure of the said draft-passage at a predetermined time.

5. In a fireless cooker, the combination with a container having an ingress draft-passage in its lower end, of a cooking-receptacle located in the said container, a pre-heater located below the said container in line with the said draft-passage, an extensible pre-heater carrier comprising two pivotal rods located one above the other in the same vertical plane, two tubes sleeved over the said rods, and means for connecting the said tubes and rods and for operating them, and means for automatically releasing the said carrier at a predetermined time for the movement of the pre-heater from its heating position into its heat-conserving position.

6. In a fireless cooker, a cooking receptacle, a pre-heater movable toward and away from the same, clock mechanism, and means controlled by the same for moving the pre-heater toward the said receptacle.

7. In a fireless cooker, a cooking receptacle, a pre-heater movable into heating, heat-conserving and lighting positions with respect to the said receptacle, and means for automatically moving the pre-heater into its heat-conserving position at a predetermined time.

8. In a fireless cooker, a stationary food-container, a heating burner movable toward and away from said container, clock mechanism, and means controlled by said clock mechanism for shifting said burner toward said container.

9. In a fireless cooker, a stationary food-container, a heating burner movable toward and away from said container, clock mechanism, and means controlled by said clock mechanism for shifting said burner toward said container, the burner being provided with a marginal rim, and the food-container being provided with a seat for said rim.

10. In a fireless cooker, a removable but normally stationary food-container, a heating burner movable toward and away from said container, clock mechanism, and means controlled by said clock mechanism for shifting said burner toward said container.

In testimony whereof, I have signed this specification in the presence of two subscribing witnesses.

ROSS M. G. PHILLIPS.

Witnesses:
GEORGE D. SEYMOUR,
CLARA L. WEED.